US009558602B1

(12) United States Patent
Straz

(10) Patent No.: US 9,558,602 B1
(45) Date of Patent: Jan. 31, 2017

(54) SMART SWITCH FOR PROVIDING CONTAINER SECURITY

(71) Applicant: Globaltrak, LLC, Rochelle Park, NJ (US)

(72) Inventor: Ronald Straz, Annandale, VA (US)

(73) Assignee: GlobalTrak, LLC, Dulles, VA (US)

( * ) Notice: Subject to any disclaimer, the term of this patent is extended or adjusted under 35 U.S.C. 154(b) by 105 days.

(21) Appl. No.: 13/896,296

(22) Filed: May 16, 2013

Related U.S. Application Data

(60) Provisional application No. 61/647,578, filed on May 16, 2012.

(51) Int. Cl.

| | |
|---|---|
| ***G05B 19/00*** | (2006.01) |
| ***G07C 9/00*** | (2006.01) |
| *E05B 47/00* | (2006.01) |

(52) U.S. Cl.
CPC ... *G07C 9/00007* (2013.01); *E05B 2047/0096* (2013.01); *G07C 9/00111* (2013.01); *G07C 2009/00865* (2013.01); *G07C 2209/08* (2013.01)

(58) Field of Classification Search
CPC ..................... G07C 9/00111; E05B 2047/0096
See application file for complete search history.

(56) References Cited

U.S. PATENT DOCUMENTS

| | | | | |
|---|---|---|---|---|
| 5,836,510 | A * | 11/1998 | Kirchner | 232/15 |
| 2003/0060212 | A1* | 3/2003 | Thomas | 455/456 |
| 2005/0033991 | A1* | 2/2005 | Crane | 713/201 |
| 2008/0047329 | A1* | 2/2008 | Breed | G01N 35/00871 73/61.41 |
| 2011/0187496 | A1* | 8/2011 | Denison et al. | 340/5.53 |
| 2011/0276609 | A1* | 11/2011 | Denison | 707/812 |
| 2013/0033381 | A1* | 2/2013 | Breed | B60T 1/005 340/568.1 |

* cited by examiner

*Primary Examiner* — Omeed Alizada

(57) ABSTRACT

A system, apparatus, and method for a smart switch are provided. The smart switch may be integrated into various types of security devices and intelligently protect the devices from unwanted manipulation. In one particular embodiment, the smart switch may use location information from a GPS receiver to determine whether the device is in a safe zone, and the smart switch may intelligently enable or disable certain changes of the current operational status of the security device. Alternatively, pre-set time period, RFID authorization, environmental factors, or a combination of several factors may be used by the smart switch to determine whether users may change the operational status of the security device.

1 Claim, 4 Drawing Sheets

SMART SWITCH FOR PROVIDING CONTAINER SECURITY

BACKGROUND OF THE INVENTION (1) Field of the Invention

The present invention relates generally to container security and, more particularly, to a smart switch that may be integrated into various types of security devices in order to intelligently protect the devices from unwanted manipulation.

(2) Background Art

Containerized shipping is a critical component of domestic and international trade. The fourth element of the 2002 Container Security Initiative (CSI) calls for smarter, tamper evident shipping containers. Cargo container monitoring and security devices are incorporated into new cargo container models and/or retrofitted into existing models. These devices have been designed to warn of intrusion, transmit location information, and deter unwarranted breaches of security.

A high degree of security is necessary during many stages of container transportation. However, when containers are located inside a safe zone or near authorized personnel, it is desirable to turn off the security functions, shut down the monitoring or security devices, or re-initialize the security devices. Without a security threat, it would be a simple matter for an operator to power down the container security system in some situations.

However, it is necessary that only authorized personnel in special situations are able to turn the security or monitoring devices off. Such protection is often implemented by using a physical key or some other equivalent tools. With containers frequently transported worldwide, authorized operators cannot always be relied upon to have the right keys or codes in a timely manner. This logistical issue hinders the wide acceptance of more sophisticated security measures, and slows down the shipping process due to human errors.

BRIEF SUMMARY OF THE INVENTION

The object of the present invention is to overcome the shortcomings disclosed in the prior art. In a preferred embodiment, the smart switch of the present invention may be automatically enabled or disabled according to a geo-zone identified by a GPS receiver. More specifically, inside a safe zone, the smart switch is preferably enabled to allow the operators controlling the security devices to turn on/off the monitoring functions, initialize the device, or configure the alarm settings. When outside the safety zone, the smart switch may preferably be disabled to prevent unwanted manipulation by unauthorized individuals. According to another preferred embodiment, the smart switch may be enabled using a near field communication authorization process. In yet another preferred embodiment, the smart switch may be automatically disabled according to a time setting.

DETAILED DESCRIPTION OF THE INVENTION

Figure 1:
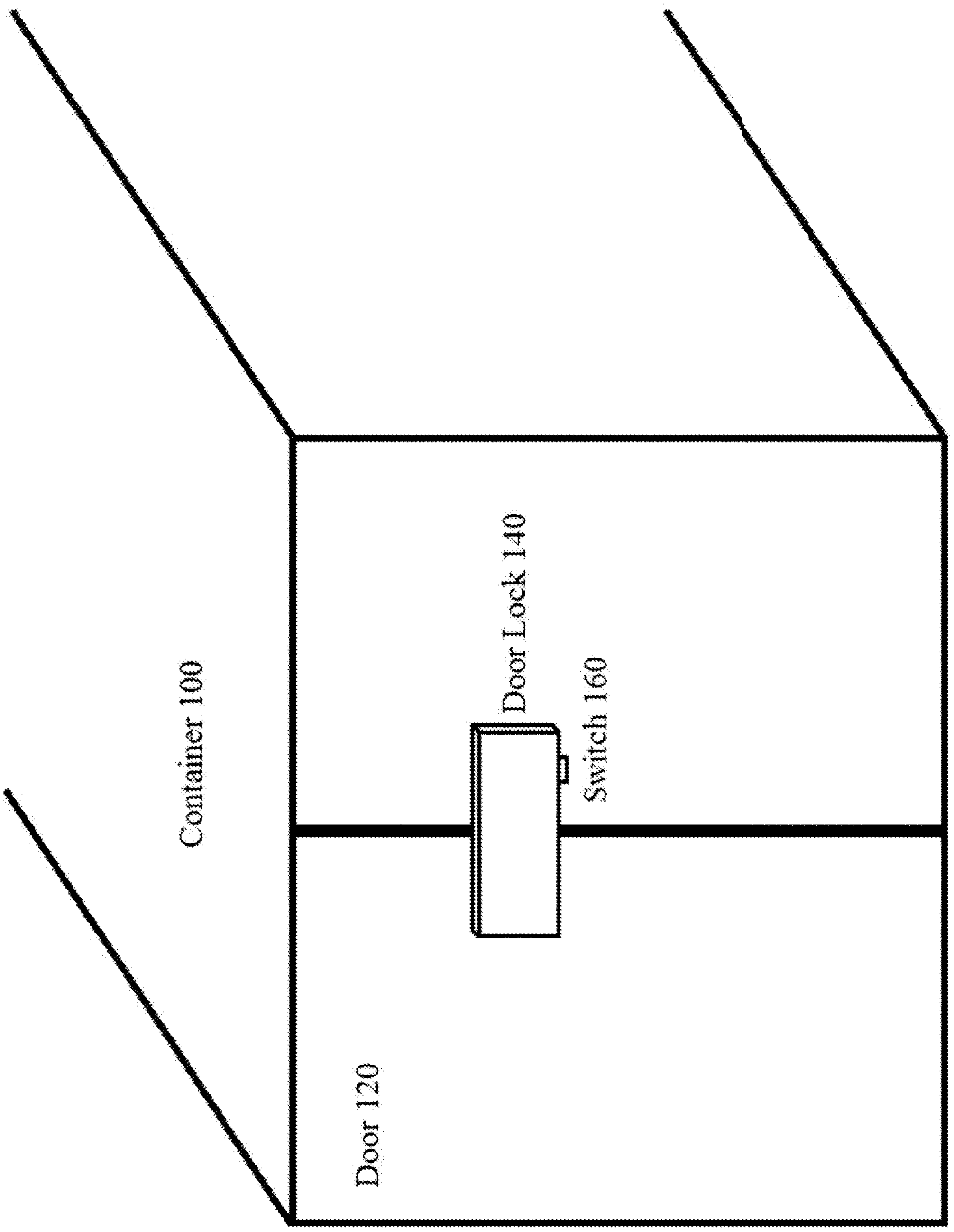
FIG. 1 shows a smart switch door lock on a shipping container.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

The present invention discloses a smart switch that may be integrated into various types of security devices, such as a door lock, an electronic door seal, or a container monitoring unit. According to one embodiment, the smart switch when enabled may be used to change the operational status of the device. For instance, the smart switch of the present invention may automatically determine whether it is safe to enable the switch function according to a set of environmental factors. When it is determined to be out of the predefined safe condition, the smart switch may be disabled. For illustration purposes, a physical switch is described in the following embodiments. However, the smart switch concept may be applied to any user operable element on a security device, such as a button, a lever, a key pad, and other types of user input components. In more advanced cases, the user operable element may be a user oriented near field wireless device. According to this aspect of the present invention, the smart switch function may disable some or all user oriented near field wireless communication outside of pre-defined safe conditions.

The various embodiments of the present invention are especially beneficial for container security applications. For example, when a shipping container is being loaded in a secure parking lot, the smart switch may automatically enable the user operation of a container security device, so that the operator does not have to use a key to turn on/off or configure of the security device. Once the shipping container has been loaded and moved out of the secure parking lot, the smart switch may disable the access device or change the security function of the device. The present invention may also apply to other mobile security applications at fixed locations.

With reference now to FIG. 1, a functional configuration in accordance with an embodiment of the present invention will now be discussed. As shown in FIG. 1, the container 100 is equipped with a smart switch enabled door lock 140. In this particular example, a switch 160 is visible on bottom side of the door lock. The switch 160 may be located on any part of the door lock surface. When the smart switch 160 is enabled, the door lock may operate in the similar fashion to regular door locks for shipping containers. However, when in transit or outside a designated safe area, the smart switch 160 of the present invention may be automatically disabled so that the door lock cannot be unlocked, for instance during a shipping journey.

In one preferred embodiment, the smart switch of the present invention may be coupled with a GPS receiver and thus capable of determining its current location. Based on the determined location, the smart switch of the present invention may compare the current location to the safe zones defined in a local or remote database. Preferably, a safe zone may be defined as a location with pre-defined boundaries or a geographic location. In operation, when the current location of a container is inside a pre-defined safe zone, the smart switch may preferably be enabled and the door lock in this mode may be allowed to operate in a normal fashion. Alternatively, when the current location of a container is outside of a pre-defined safe zone, the smart switch may be disabled, and the door lock may be kept in a locked status preventing the container from being accessed outside of the safe zones.

In another preferred embodiment, the smart switch 160 may be enabled using a near field communication authorization process. This particular embodiment may be implemented alone or in combination with the above geo-zone based smart switch function. One preferred example of the near field communication authorization process may be implemented using RFID technology. According to this aspect of the present invention, when the smart switch on the door lock is disabled, an operator may use a RFID reader or a RFID enabled cell phone to communicate with the smart switch to gain authorization for access (using an access code or the like). If the authorization procedure succeeds, the smart switch will be enabled to allow the normal operation of the door lock.

According to a further in another preferred embodiment, the smart switch 160 may be enabled then to be automatically disabled after a pre-determined period or at a pre-determined time. This particular embodiment may be implemented with other smart switch enablement conditions, for example, in combination with the above geo-zone based smart switch functions or identification based smart switch functions. In one particular example, an authorized operator may enable the switch for a short period of time to allow a worker to load or unload the container, and after a pre-determined period or at a pre-determined time, the smart switch door lock may be disabled to prevent future access to the container.

As detailed above, the physical configuration of the door lock and the smart switch is provided for illustration purposes only. The illustrated physical switch is merely one example of a user operable element to control the door lock. Flexible configuration options of the door lock and the switch are contemplated as would normally occur to one skilled in the art.

Further, a smart switch may be integrated into an electronic door seal, container monitoring unit, or other security devices for container or non-container applications. In a preferred example of a smart switch electronic door seal, a physical switch component may be implemented on the electronic door seal to turn on/off the door seal. In a preferred example, a GPS location based smart switch electronic door seal may automatically disable risky user operations after the door seal leaves the safe zone. Preferably, the GPS smart switch door seal may automatically enable the switch function when the seal is inside of a safe zone, and automatically disable the switch function when the seal is outside of safe zones.

Figure 2:
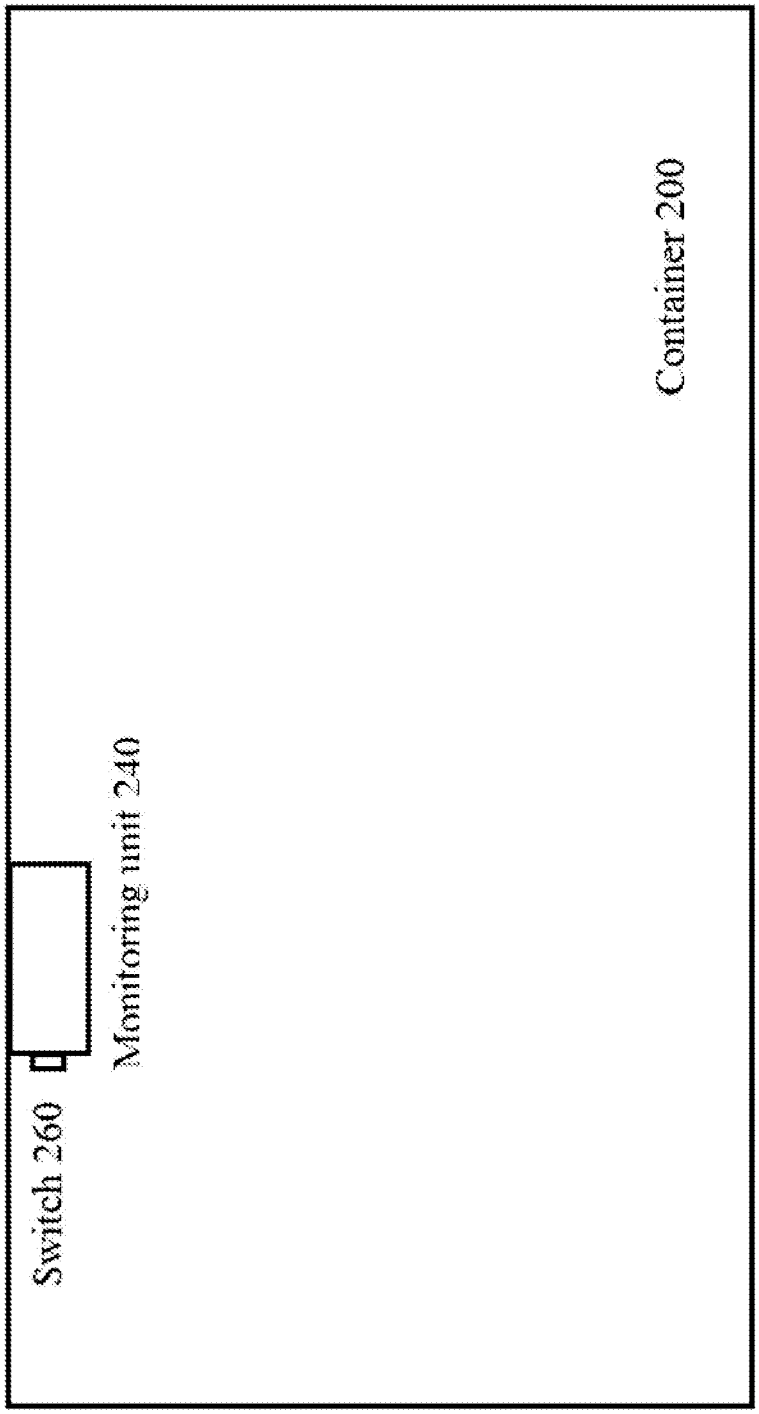
FIG. 2 shows a smart switch monitoring unit on a shipping container.

With reference now to FIG. 2, a functional configuration in accordance with an embodiment of the present invention will now be discussed. As shown in FIG. 2, the container 200 according to a preferred embodiment may be equipped with a smart switch enabled monitoring unit 240. The monitoring unit may have common monitoring functions and may be coupled with sensors and control devices via wireless or wired connections. In the embodiment illustrated in FIG. 2, a switch 260 may be located on the side of the monitoring unit. This physical configuration of the smart switch is provided for illustration purpose. Flexible configuration options of the monitoring unit and the smart switch component are contemplated as would normally occur to one skilled in the art. In operation, when the smart switch 260 is enabled, the monitoring unit may be turn on or off. Alternatively, the smart switch 260 may be automatically disabled so that the monitoring unit cannot be turned off and its configuration cannot be altered, for instance after the shipping container is loaded and transferred to a shipper.

In one preferred embodiment, the smart switch may be connected to a GPS receiver in order to receive location data. In operation, the smart switch may compare the current location to the safe zones defined in a local or remote database. According to one preferred mode of operation, the smart switch will remain enabled only when the current location is inside a pre-defined safe zone.

Figure 3:
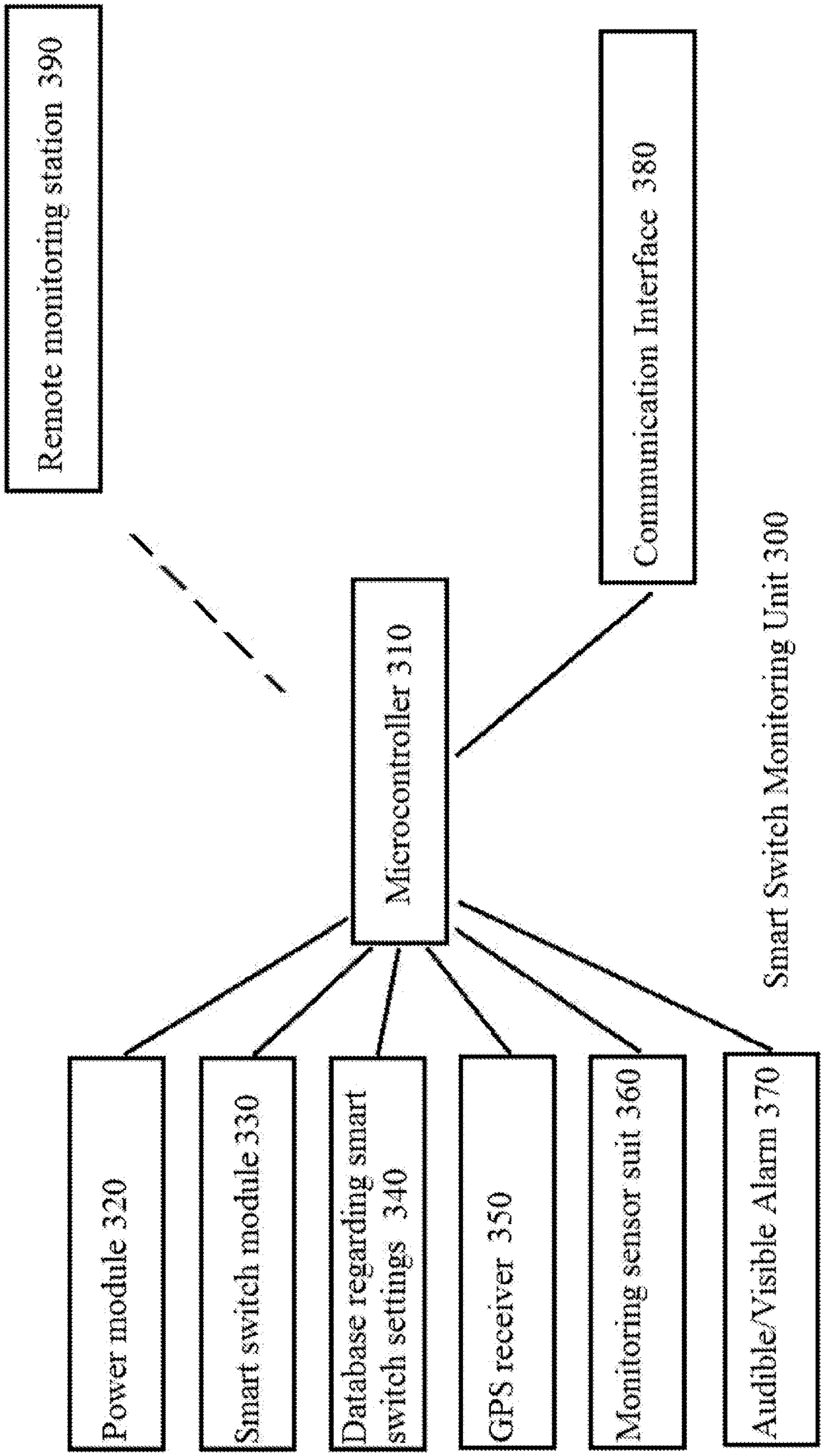
FIG. 3 shows a block diagram of a security device integrated with a smart switch.

With reference now to FIG. 3, a functional block diagram of a security device integrated with a smart switch is provided for illustration. As shown in FIG. 3, the smart switch monitoring unit 300 includes a microcontroller 310, a power module 320, and a functional module 330 for the smart switch function.

Using an example of a GPS enabled smart switch monitoring unit 300 as shown in FIG. 3, an exemplary unit may include a GPS receiver 350, a monitoring sensor suite 360, and an audible/visible alarm unit 370. The monitoring sensor suit 360 may include one or more sensors depending on the use of the monitoring unit, such as a hall effect sensor, a motion sensor, a light sensor, a micorbolometer, a smoke detector, a carbon monoxide sensor, a vibration sensor, a temperature sensor, an auditory sensor, or other type of sensor. The sensors may be integrated within the physical enclosure of the monitoring unit, or connected to the monitoring unit via wireless/wired connections. The smart switch module 330 may be implemented as a pure software module and executed by the microcontroller 310. Alternatively, the smart switch module 330 may be implemented as a combination of a visible user input component and a software module. In a preferred embodiment, the smart switch module may preferably compare the current location (according to the information from the GPS receiver) to the safe zones defined in a local or remote database 340. When the detected location is inside a pre-defined safe zone, the smart switch may preferably be enabled and a user may be able to turn off the monitoring unit in a similar fashion to a prior art monitoring unit without a smart switch. When the detected location is outside of a pre-defined safe zone, the smart switch may be disabled and any use of the switch to disable the system may be prevented.

In an alternative preferred embodiment, the determination step in the smart switch module may be executed in a remote monitoring station 390. According to this embodiment, the remote monitoring station 390 will receive the location information from the monitoring unit 300 and the remote monitoring station may compare the unit location to determined safe zones. Thereafter, the decision to enable or disable the smart switch will be transmitted to the smart switch monitoring unit for execution. Furthermore, the decision of enabling/disabling the smart switch function may be made according to a comprehensive set of information available locally and remotely.

According to various embodiments, many different environmental factors may be used to determine whether certain changes to the operational status of the protected device are warranted. Further, a smart switch function having several sets of safe conditions associated with two, three, or more safety levels may be implemented on a single security device. In an exemplary embodiment, a smart switch security device may store and be aware of a first set of predefined safe zones where the on/off button will be enabled. In addition, the smart switch security device may also have a second set of pre-defined safe zones where a user, for instance, may be required to use an alternative format to access the device such as an RFID access code to read data only. According to the present invention, a flexible combination of multiple user operable elements and multiple safety levels on a single smart switch security device are contemplated.

Further in accordance with the present invention, the settings for the smart switch function may be configured by the manufacturer, or by authorized locally or remotely. In a further preferred embodiment, the remote monitoring station 390 may update the settings for the smart switch function on the fly if necessary. Additionally, the smart switch monitoring unit 300 may regard any attempt to use or manipulate the smart switch when it is disabled as an alarming event, which may trigger audible/visible alarms, and reporting of the alarming event to a remote monitoring station.

Figure 4:
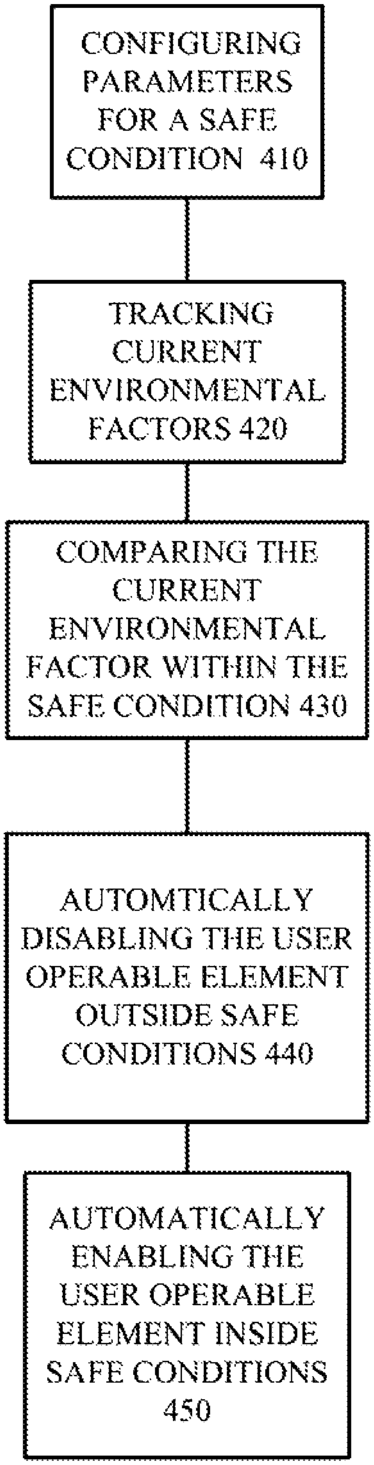
FIG. 4 shows a method for intelligently enabling and disabling a user operable element in accordance with one embodiment of the present invention.

With reference now to FIG. 4, a method for intelligently enabling and disabling a user operable element will now be discussed. As shown in FIG. 4, a method in accordance with one embodiment of the present invention includes a first step of configuring parameters for a safe condition, which may include location, times or ordered events 410. Thereafter, the smart switch may then preferably track current environmental factors 420 and compare the current environmental factors with parameters defining a safe condition 430. The smart switch may be set to automatically disable the user operable element when the current environmental factor is not in the safe condition 440. Alternatively, the smart switch may automatically enable the user operable element when the current environmental factors indicate a safe condition 450. Preferably, according to one aspect of the present invention, the parameters defining a safe condition may be preset. Alternatively, according to a further aspect of the present invention, the parameter defining a safe condition may be configured by a user. Still further, according to a further aspect of the present invention, the parameters defining a safe condition may be configured by a remote monitoring station. According to a preferred embodiment, the preferred safety conditions may be configured as a geolocation with defined boundaries.

Communication System

In accordance with a preferred embodiment of the present invention, the communication between a smart switch security device and a remote monitoring station may be made via a wireless connection to a satellite mode to communicate with a satellite system such as Globalstar or Orbcomm. Such a satellite device may be a device such as the Axxon, AutoTracker, or the like, or a customized Orbcomm VHF satellite GPS tracking communications device that may be adapted with ZigBee interface antenna devices to incorporate them into the overall LAN architecture of the security system.

In accordance with an alternative preferred embodiment of the present invention, the remote communications may also be made using a wireless system independent from the satellite system. One example of such a wireless system is the GSM cellular system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the ZigBee (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

As referred to above, all communications of the present invention may be designed to be duplex or simplex in nature. Further, as needs require, the processes for transmitting data to and from the present invention may be designed to be push or pull in nature. Still further, each feature of the present invention may be made to be remotely activated and accessed from distant monitoring stations. Accordingly, data may preferably be uploaded to and downloaded from present invention as needed. For example, as detailed above, each system and subsystem of the present invention may be designed to send, receive, report and request information via the wireless and/or satellite systems so as to continually maintain and update the container systems.

Additional communications with the communications manager are preferably enabled via industry standard wired interfaces, with communications protocols implemented in firmware for future upgrade. These interfaces preferably will include at least two RS-322 compatible serial ports. These alternate serial ports may assist the communications manager to interface with additional remote sensors as well as other local reader/controllers such as an RFID reader or other devices.

While the above descriptions regarding the present invention contain much specificity, these should not be construed as limitations on the scope, but rather as examples. Many other variations are possible. Accordingly, the scope should be determined not by the embodiments illustrated, but by the appended claims and their legal equivalents.

What is claimed is:

1. A smart switch apparatus for automatically enabling and disabling user operation of the apparatus, the apparatus comprising:

a user operable element, wherein the user operable element under a pre-defined safe condition is capable of changing a current operational status of the apparatus;

a sensor suite, wherein the sensor suite is capable of detecting a plurality of current environmental conditions; wherein the plurality of current environmental conditions includes the group of environmental conditions which includes: light level, temperature and carbon monoxide level;

a processor, wherein the processor is coupled with the user operable element, further wherein the processor configured to compare a light level, temperature and carbon monoxide level to the pre-defined safe condition and determining whether to enable or disable the user operable element.

* * * * *